United States Patent [19]

Salvo

[11] Patent Number: 5,574,531
[45] Date of Patent: Nov. 12, 1996

[54] METHOD OF AND APPARATUS FOR LIGHTTIGHT TRANSFERRING OF FILM

[75] Inventor: Lawrence J. Salvo, Stow, Mass.

[73] Assignee: Polaroid Corporation, Cambridge, Mass.

[21] Appl. No.: 410,147

[22] Filed: Mar. 24, 1995

[51] Int. Cl.$^6$ .................................................... G03D 3/08
[52] U.S. Cl. ........................................ 396/33; 396/612
[58] Field of Search ............................. 354/83, 86, 275, 354/308, 310, 319

[56] References Cited

U.S. PATENT DOCUMENTS

| | | | |
|---|---|---|---|
| 1,648,525 | 11/1927 | Wittel . | |
| 3,616,734 | 11/1971 | Inoue | 95/11 |
| 4,348,086 | 9/1982 | Forscher | 354/83 |
| 4,505,560 | 3/1985 | Kozai | 354/86 |
| 4,531,818 | 7/1985 | Bally | 354/83 |
| 4,568,163 | 2/1986 | Czumak et al. | 354/88 |
| 5,258,794 | 11/1993 | Woltz et al. | 354/275 |
| 5,292,612 | 3/1994 | Polizzotto et al. | 430/207 |
| 5,292,617 | 3/1994 | Feinberg et al. | 430/271 |
| 5,327,187 | 7/1994 | Slavitter | 354/275 |

*Primary Examiner*—D. Rutledge
*Attorney, Agent, or Firm*—Leslie Payne

[57] ABSTRACT

There is provided an apparatus for use in shuttling a film container housing a photosensitive film unit between an image recording apparatus and a film processor. When the shuttle is in operative relationship within the image recording apparatus, the film unit is exposable and when the shuttle is being transferred it is done so in a lighttight manner. The shuttle includes a portable lighttight housing assembly for removably receiving the film container. The housing assembly includes an exposure aperture registerable with a film container exposing aperture, such as occurs when the film container is received within the shuttle. For selectively blocking the image forming light there is provided a blocking means which is coupled to the housing assembly and is operable with a control means for automatically changing conditions between its light blocking and unblocking states.

8 Claims, 12 Drawing Sheets

METHOD OF AND APPARATUS FOR LIGHTTIGHT TRANSFERRING OF FILM

CROSS-REFERENCE TO RELATED APPLICATIONS

The present application relates to U.S. patent application; Ser. No. 08/302,603, now U.S. Pat. No. 5,512,471, entitled "METHOD OF AND APPARATUS FOR TRANSFERRING FILM" filed on Sep. 8, 1994; and, copending U.S. patent application; Ser. No. 08/312,420 entitled "CASSETTE FOR ENCLOSING A PLURALITY OF NEGATIVE FILM UNITS", filed on Sep. 26, 1994; and, Ser. No. 08/302,220, entitled "CAMERA BACK ADAPTER AND METHOD" filed Sep. 8, 1994.

BACKGROUND OF THE INVENTION

The present invention relates generally to methods and apparatus for transferring photographic film. More particularly, it relates to providing a film carrying mechanism in a manner that minimizes light leakage to the film.

Heretofore, a wide variety of approaches have been proposed in the photographic arts for storing and transferring film in a lighttight manner. This invention is directed to an improved shuttle mechanism of the type noted in the above-noted patent application for use in shuttling a film container including a housing exposure opening and at least a film unit between an image recording apparatus and a film processor. Basically, the shuttle includes a portable lighttight housing assembly having an exposure aperture registerable with the exposure opening of the container. For selectively blocking passage of the image forming light through the registered opening and aperture to the film, the shuttle includes a blocking assembly operable automatically for changing the latter's conditions between light blocking and unblocking conditions. The light blocking assembly comprises a flexible and opaque shutter which is itself provided with at least a shutter aperture for allowing desired exposure of the film when the shutter aperture is registerable with the registered opening and aperture of the film container and shuttle. While such a shutter curtain provides for the necessary lighttight functions when the shutter is in use or in non-use, there is a continuing desire to improve upon the manner in which the film is protected against light leakage.

SUMMARY OF THE INVENTION

According to the present invention, there is provided an apparatus for use in shuttling a film container housing a photosensitive film unit between an image recording apparatus and a film processor. When the shuttle is in operative relationship within the image recording apparatus, the film unit is exposable and when the shuttle is being transferred it is done so in a lighttight manner. The shuttle includes a portable lighttight housing assembly for removably receiving the film container. Such a housing assembly includes an exposure aperture registerable with a film container exposing aperture, such as occurs when the film container is received within the shuttle. For selectively blocking the image forming light there is provided a blocking means which is coupled to the housing assembly and is operable with a control means for automatically changing conditions between its light blocking and unblocking.

The light blocking assembly comprises a shutter assembly including a pair of flexible and opaque shutters which are themselves provided with at least one aligned shutter aperture. The shutters are movable together between a supply roller assembly and a takeup roller assembly mounted in the shuttle housing. The shutter curtains are automatically movable when the shutter assembly is actuated for selectively allowing image bearing light to expose the film unit. In this regard, the shutter apertures are positionable in light passing relationship, when the blocking assembly is in the light unblocking condition. The shutter apertures are not in light passing relationship when the blocking assembly is in either the first or second light blocking conditions, such as when shuttle assembly is being transferred. A pair of light baffles is interposed between the pair of shutters in a manner so that each baffle is interposed along one of the longitudinal edge portions of the shutters for a distance which exceeds the length of the shuttle housing and container apertures to thereby form labyrinth passages for light so as to reduce light leakage.

In another illustrated embodiment, provision is made for having a pair of spaced shutter panels in superimposed relationship to each other whereby the shutters are joined together adjacent their longitudinal edges so as to form longitudinally extending grooves. A pair of light baffles is provided, wherein each one is slidably interposed within a respective groove so as to form labyrinth passages which enhance the lighttight performance of the shutter.

In other embodiments, there is provided a method of enhancing the lighttight features of a shuttle for shuttling film housed in a film container between an image recording apparatus and a processor for processing the film.

Among the other objects and further scope of applicability of the present invention are the provision of an apparatus and method which reliably shuttle, in a lighttight manner, film contained in a container from an image recording device to a processor; and, the provisions of an apparatus and method which are simple and reliable in operation.

These and other objects and features and the invention itself will become apparent from the following description when taken in conjunction with the accompanying drawings wherein like structure throughout the several views are indicated by like reference numerals.

DETAILED DESCRIPTION

Figure 1:
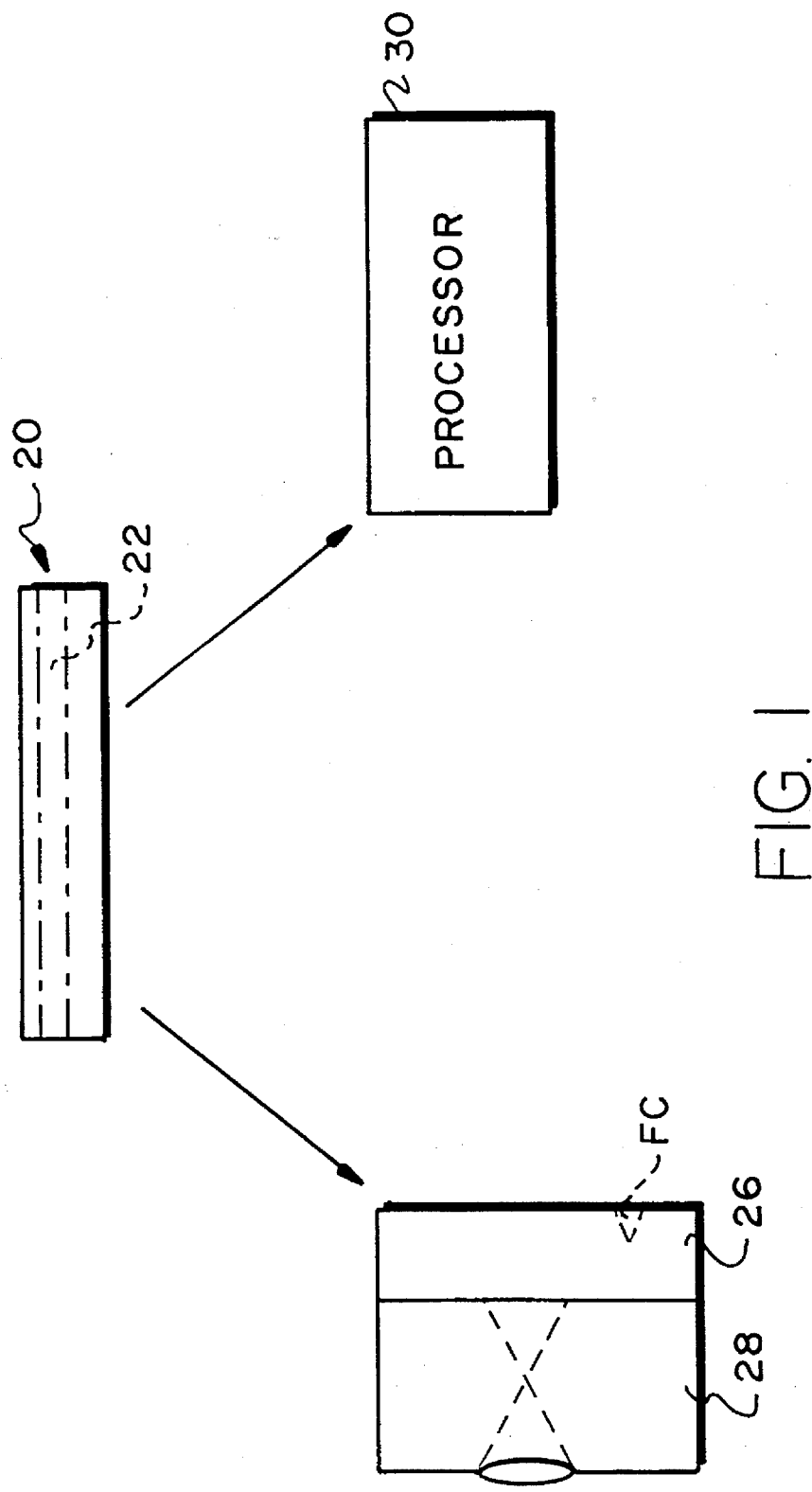
FIG. 1 is a schematic view of one preferred embodiment of the present invention using a shuttle in transferring a film cassette between a photographic apparatus and a film processor.

Reference is made to FIGS. 1–10 for illustrating one preferred embodiment of a portable, film transporting or shuttle assembly 20. The shuttle assembly is like that described in connection with copending and commonly assigned patent application Ser. No. 08/302,603 which is incorporated herein as a part hereof. Therefore, only those parts of the shuttle necessary for understanding the present invention will be set forth herein.

Basically, the shuttle assembly 20 removably receives a negative film cassette 22 of the type containing a stack of negative photographic film units 24 of the self-developing, peel-apart type. The negative cassette 22 is similar to that described in the aforenoted U.S. patent application entitled "CASSETTE FOR ENCLOSING A PLURALITY OF NEGATIVE FILM UNITS" and is incorporated herein. The shuttle assembly 20 serves to store and shuttle the film cassette 22 in a lighttight manner between a camera back adapter 26 and a separate film processor 30. The shuttle assembly 20 is also constructed to permit sequential film exposure, and to allow the processor to remove each unit, after each exposure, for processing of the same.

In this embodiment, the film unit 24 is a negative sheet assembly like that described in commonly assigned U.S. Pat. Nos. 5,292,612; and 5,327,187. The negative assembly includes a pocket device (not shown) which is adapted to receive a force transmitting device or pick which will enable the film unit to be advanced from the cassette. The negative film assembly cooperates with a positive sheet assembly (not shown) which positive sheet assembly has an image-receiving layer thereon. The descriptions of both of these patents are incorporated herein by reference. It will be appreciated that this invention envisions that other kinds of photosensitive film units, preferably of the self-developing type, can be used.

The camera back adapter 26 is like that described and claimed in commonly-assigned and copending U.S. patent application Ser. No. 08/302,220 entitled "CAMERA BACK ADAPTER AND METHOD," filed on Sep. 8, 1994. The camera 28 is a miniportrait camera of the self-developing type which exposes a negative film unit of a peel-apart film assemblage. The camera 28 is commercially available from Polaroid Corporation, Cambridge, Massachusetts, USA. Both the adapter and the camera operate as image recording apparatus. While the present embodiment discloses a photographic camera, it will be appreciated that the present invention can be used with an electronic display screen for providing the images. The processing generally performed by the processor 30 is similar to that described in the aforenoted U.S. Pat. Nos. 5,292,617; 5,327,187; wherein the negative sheet assembly is joined to a positive sheet assembly (not shown) in an automatic peel-apart film processor for initiating film processing, whereby the positive and negative are subsequently peeled apart, and the positive sheet reveals a fully developed positive image. Neither the film cassette 22, film unit 24, camera back adapter 26, camera 28, nor the processor 30, per se, form aspects of the presently claimed invention. However, only those details thereof which are necessary for understanding this invention will be described.

As illustrated in FIGS. 2 & 4–6, the shuttle assembly 20 comprises a portable and clamshell-like housing assembly 32 that is operable between an open or negative cassette insertion and removal condition; and a closed, lighttight or cassette carrying condition. In this regard, the shuttle housing assembly 32 includes a front cover 34 that is hingedly connected by pivot pins (not shown) to a back cover 36 for movement thereof between the noted open and closed conditions.

The portable housing assembly 32 is constructed for facilitating convenient user handling and transporting. In this regard, the front and back covers 34, 36 are each made of a one-piece molded plastic construction, which when in the closed condition are constructed to have a lighttight relationship with each other for assisting in protecting the topmost negative film unit housed in the cassette 22. The front cover 34 includes a front panel 38 having a pair of laterally spaced apart sidewalls 40 and integral therewith upstanding top and bottom walls 42, 44; respectively. A generally rectangular exposure aperture 46 in the front panel 38, is dimensioned to permit desired exposure of an image receiving area 48 (FIG. 5) on a negative film unit 24. The image area 48 is juxtaposed an exposure opening 50 of the negative cassette 22 so that it can be in registry with the shuttle's exposure aperture 46 when the cassette is properly located.

The front panel 38 is formed with a pair of laterally spaced apart pick slots 52, each of which has a generally rectangular configuration and extends axially. Contiguous with the terminal portion of the pick slots 52 is a transversely extending exit slot 54 which allows each film unit to be ejected therethrough in response to a force transmitting or picking action by processor pick 56 (FIG. 6) of the processor 30. The pick 56 is reciprocated along a generally vertical path by a pick drive mechanism motor 57 (FIG. 3) located in the processor 30. The pick when operated is driven to selectively drive the film unit 24 downwardly through the slot 54 after it has emerged from a corresponding film egress (not shown) in the cassette 22. In this regard, the pick 56 passes through the pick slots 52 and corresponding pick slots 59 (FIG. 5) in the cassette, as it travels downwardly to engage a pocket 24b on the film unit. Such picking continues until the negative has emerged from both the container and the shuttle housing, whereby the negative and the positive sheet assemblies are joined together; in a manner similar to that described in the last-noted patents. As will be described subsequently, for the film to be ejected, the shuttle blocking means must be operated to accommodate such withdrawal. After completion of the picking as sensed by sensors, the motor 57 is operated to drive the pick 56 upwardly to its start position for another picking operation. Such picking does not, per se, form an aspect of the present invention.

Continued reference is made to FIGS. 2 & 4–6, wherein the top portion of the housing assembly is shown to be laterally offset with respect to a plane containing the front panel 38 for facilitating easy grasping and transporting of the housing by an operator. The front cover 34 has a locking bail 58 pivotally attached thereto for cooperating with surfaces on the back cover 36 to thereby secure the covers together in their closed orientation.

Figure 2:
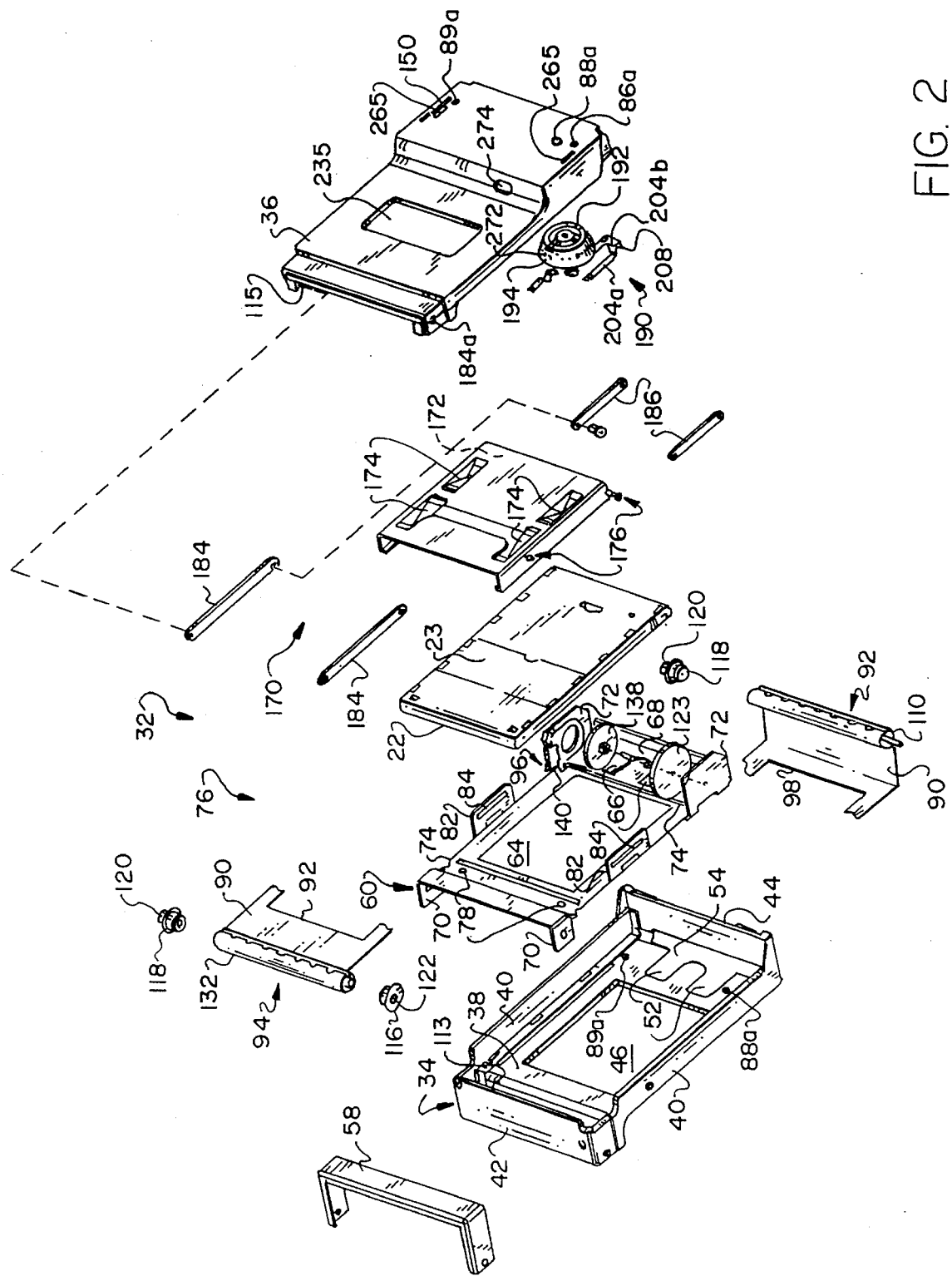
FIG. 2 is an exploded perspective view of one embodiment of the shuttle.
Figure 3:
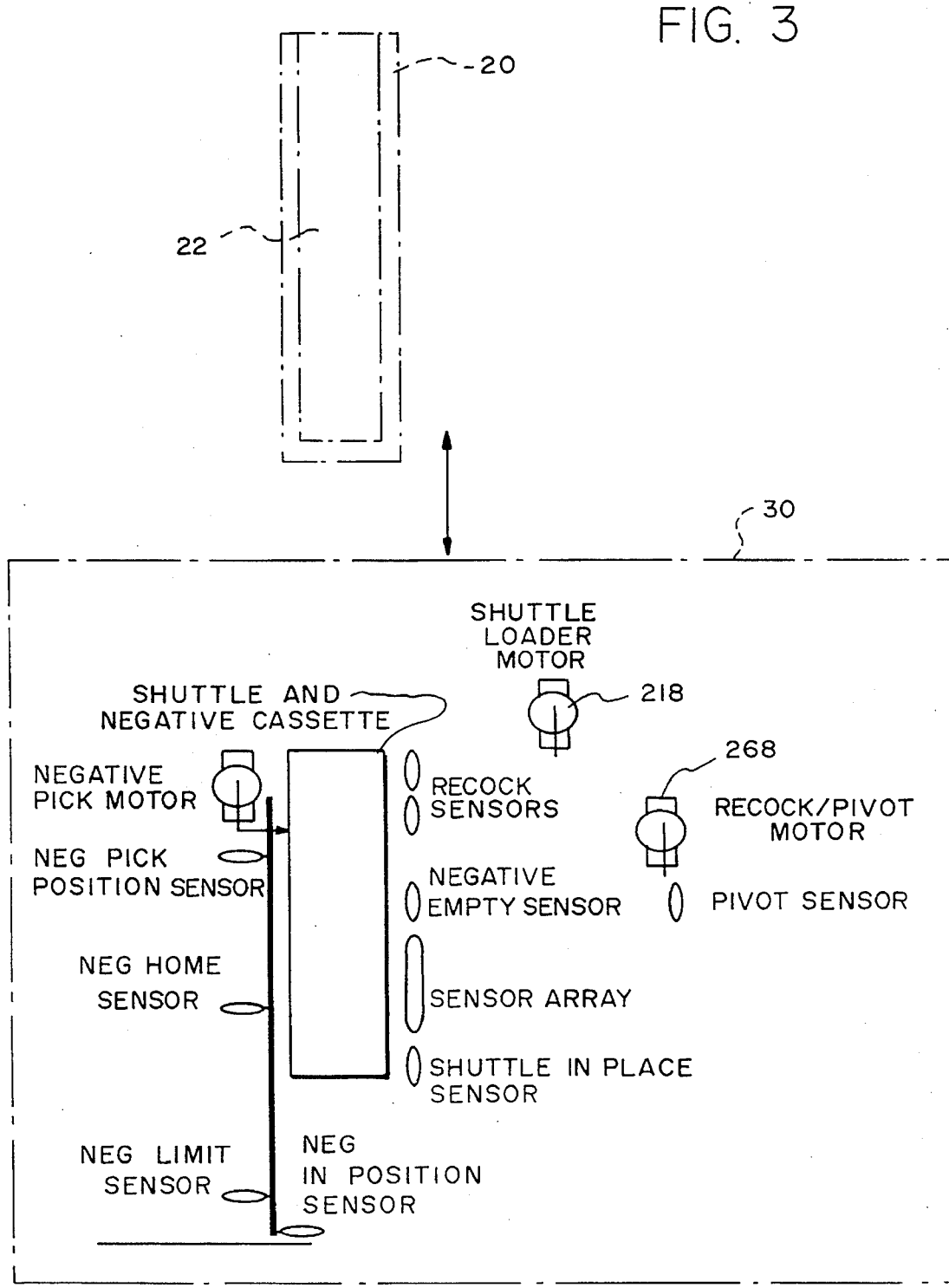
FIG. 3 is a schematic view of the shuttle in operative relationship with certain operating components of the processor.
Figure 4:
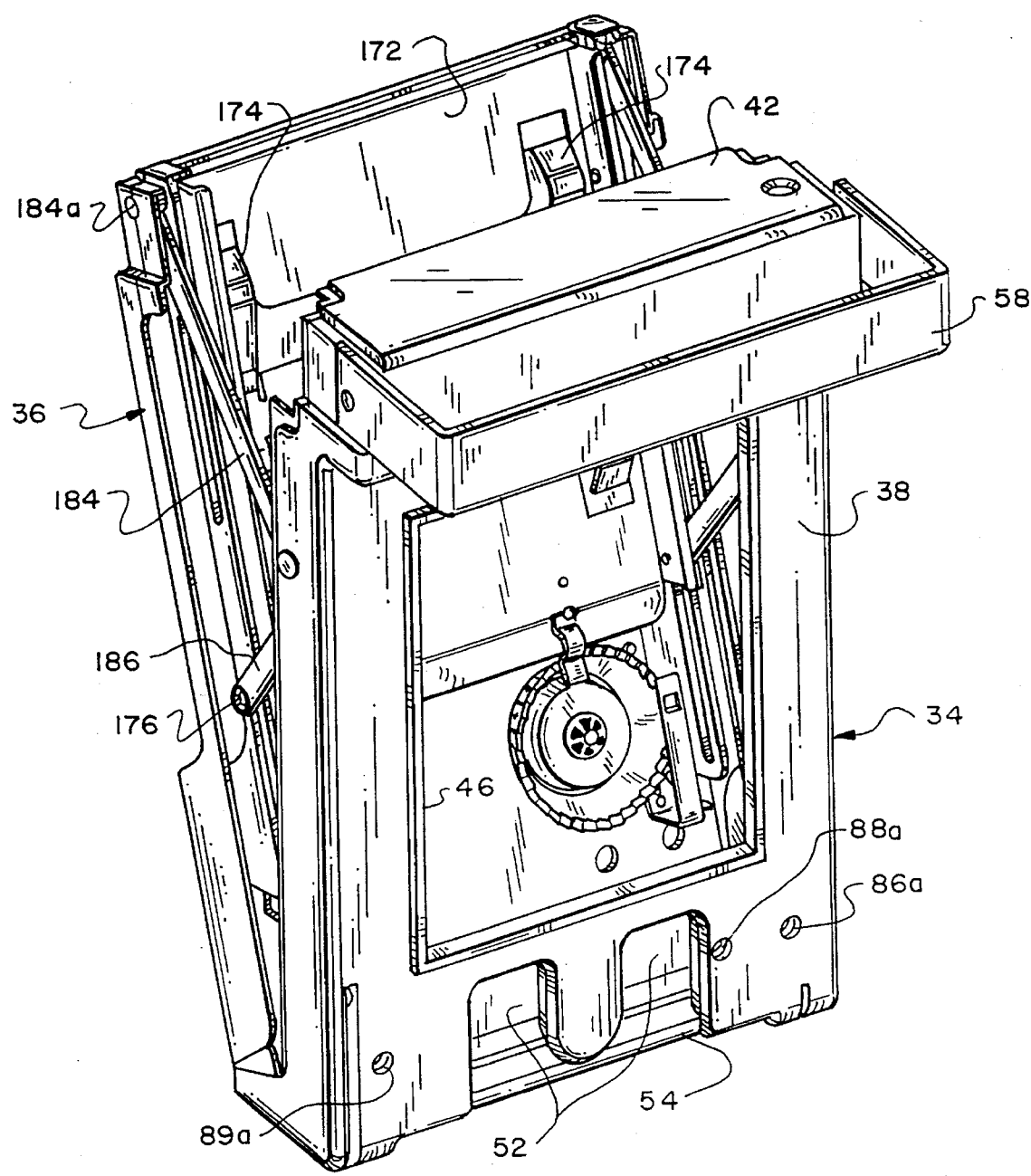
FIG. 4 is a perspective view of the shuttle in an open condition but without a negative film cassette contained therein.
Figure 5:
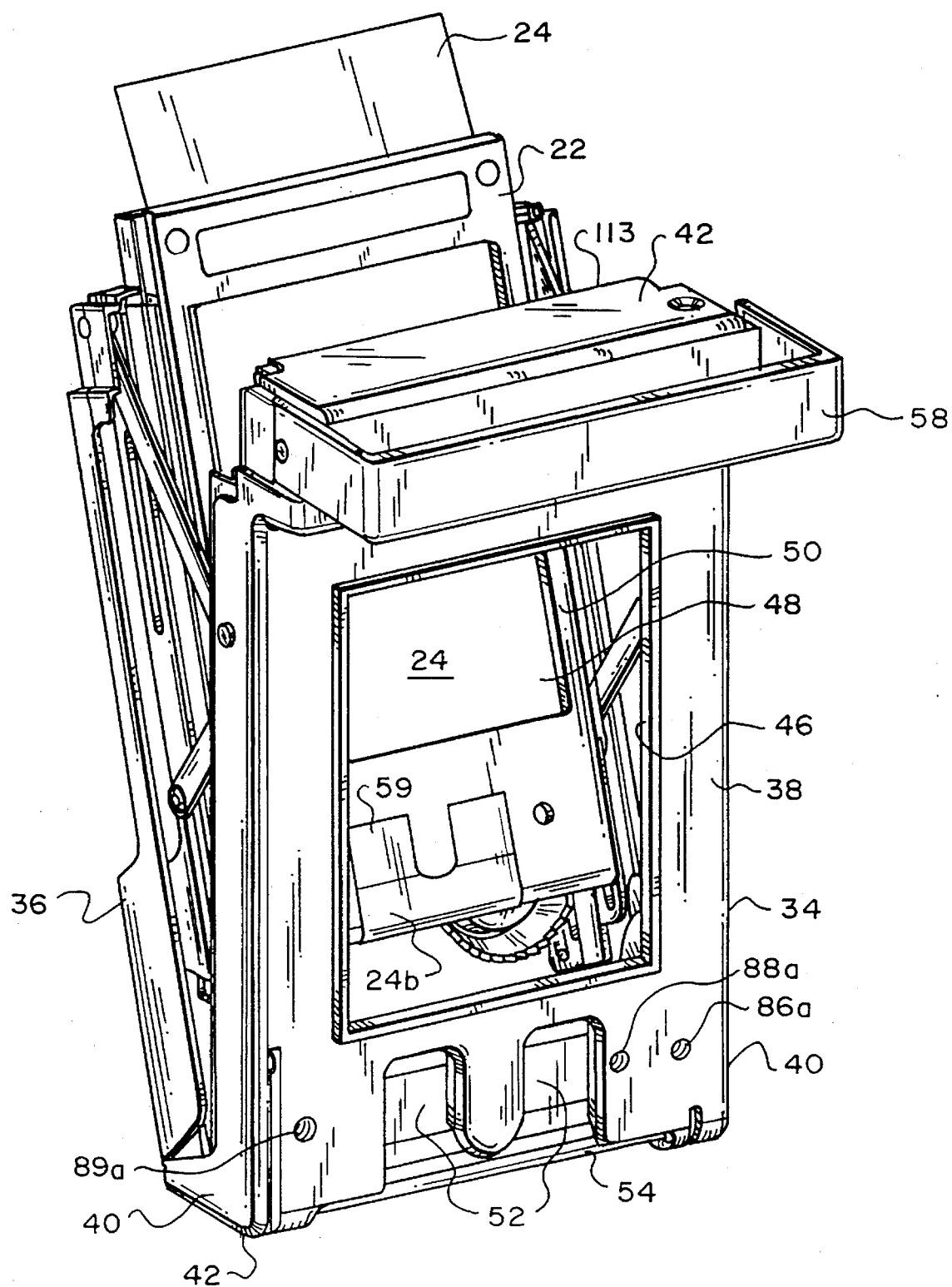
FIG. 5 is a perspective view similar to FIG. 4 but showing the open shuttle with a film cassette being inserted therein.
Figure 6:
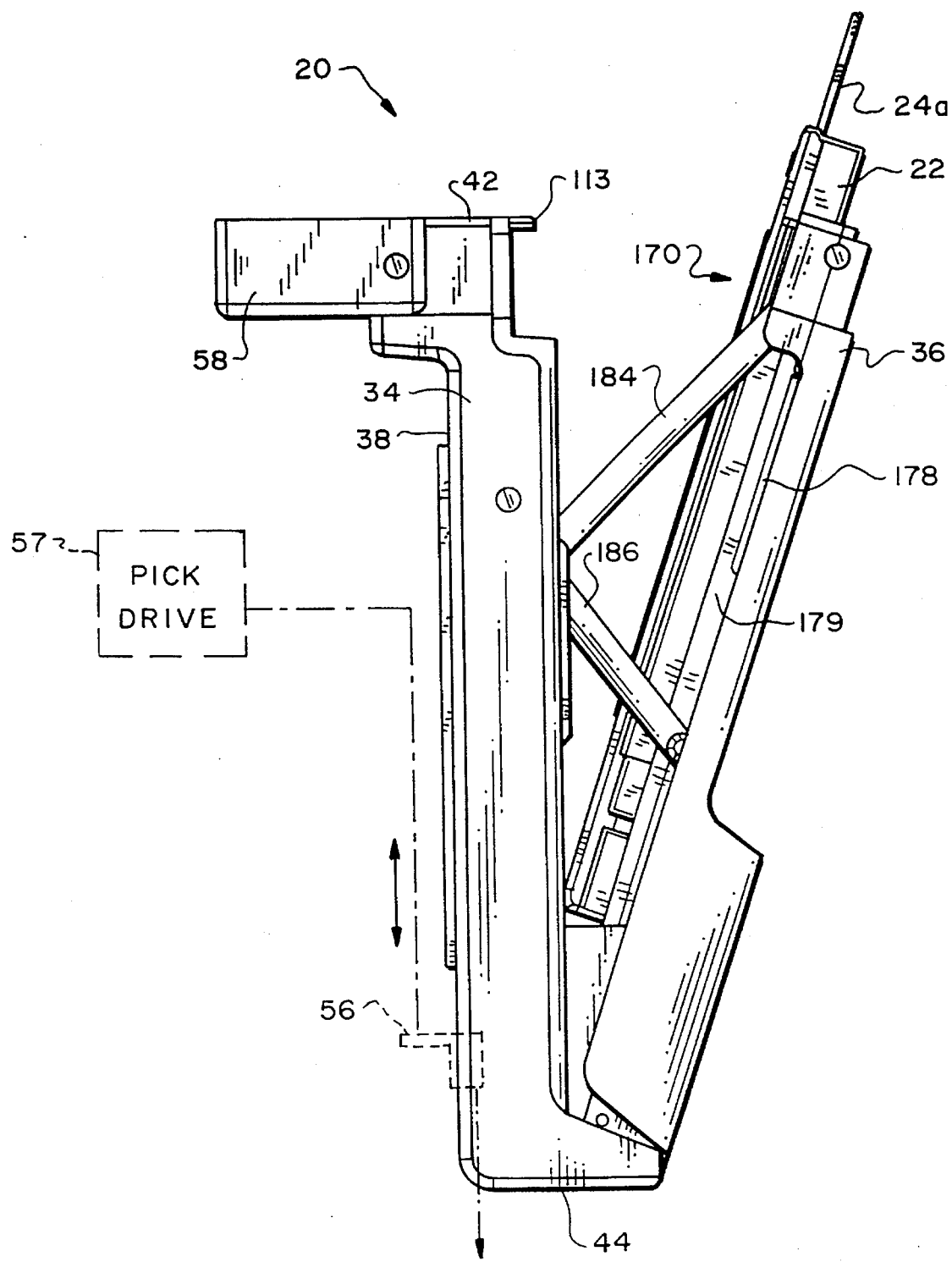
FIG. 6 is a side view of the shuttle of FIG. 5.

Reference is made back to FIG. 2 wherein there is illustrated a generally rectilinear main frame member 60. The frame member is attached at its opposite longitudinal ends to the front cover 34. The frame 60 includes a rectangular central body 62 with an exposure aperture 64 formed therein. The exposure aperture 64 is adapted to be in registry with the exposure aperture 46 as well as the exposure opening 50 when the cassette is properly inserted in the shuttle. The central body 62 includes in its bottom portion a pair of spaced apart and parallel pick slots 66, each of which is in registration with a corresponding one of the pick slots 52 and with slots (not shown) of the cassette. This registration allows for the processing picks to pick the film unit pocket and advance each successive exposed topmost film unit from the cassette 22 and the shuttle assembly 20. In this regard, a transversely extending film unit exit slot 68 is beneath and contiguous with the pick slots 66 and sized for allowing a picked film unit to pass therethrough and the slot 54 formed in the housing assembly. Formed on the central body 62 are pairs of parallel and spaced apart upper and lower retainer plates 70, 72; respectively, which extend laterally in the opposite direction from each other. A pair of spaced apart and transversely oriented protrusions 74 are formed integrally on the central body 62. One protrusion 74 is above the aperture 64 while the other is below for slidably cooperating with an automatic blocking or dark slide assembly 76 for enhancing the lighttight features provided by the blocking assembly. The body 62 provides a pair of datum openings 78 for allowing datum surfaces (not shown) on the front cover 34 to protrude therethrough for contacting the cassette 22 and properly locating the latter. Also, the body 62 has a pair of track members 82, each on a lateral edge thereof and extending in the same direction away from the aperture 64. Each of the track members 82 includes an axially extending slot 84 for cooperation with a linkage assembly as will be described. A group of photodetector openings 86, 88, 89 (FIG. 10) are provided in the main frame assembly and are operable, in a manner to be described, for indicating the operational condition of the blocking assembly. In this embodiment, the openings are adapted to be in alignment with corresponding openings 86a, 88a, 89a formed in the front and back covers. In addition, the cassette is formed with an opening (not shown) which cooperates with one of the noted photodetector openings as will be described. These photodetector openings allow photodetector beams (not shown) of suitable photodetector devices (not shown) within the processor to be transmitted therethrough in order to selectively cooperate with the blocking means for indicating the operational condition of the latter in a manner to be described as well as to indicate whether the cassette is out of negative film.

Reference is now made to FIGS. 2 & 7 A–D for illustrating several operational conditions of the automatic blocking or dark slide assembly 76 which is under the control an escapement mechanism 96 which is described in detail in the noted copending application Ser. No. 08/302,603. Since the escapement mechanism does not form part of the present invention, per se, only those details thereof necessary to understand the present invention will be set forth. The blocking assembly 76 is mounted on the main frame assembly 60 intermediate a topmost film unit (not shown) and the cover's exposure aperture 46. Basically, the blocking assembly 76 is operable to sequentially block, unblock, and reblock apertures corresponding with the image receiving area of the film unit in order to control exposure of the latter. The blocking assembly is also actuatable in the processor 30 to a move to at least a partially unblocked position (FIG. 7D) for allowing a pick of the processor to not only pick the film pocket but to eject the film unit through the noted film exit slots.

The blocking assembly 76 is also actuatable in the processor in a manner to be described so as to facilitate a return or recocking thereof to its original or first blocking condition. It will be appreciated that the present invention utilizes the indexing or escapement mechanism 96 of the last-noted application to drive the shutters on the roller assemblies. In this manner, the blocking assembly is ready for refiring thereof.

As seen in FIGS. 7A–D & 8 the blocking assembly 76 basically includes a pair of shutter assemblies or shutter curtains 90, 90'; supply and takeup roller assemblies 92, 94; respectively, attached to opposite longitudinal ends of the shutters; an escapement mechanism 96 which permits rapid and precise indexing of the blocking assembly; and light baffles 98 cooperating with the pair of shutter assemblies.

Figure 7A:
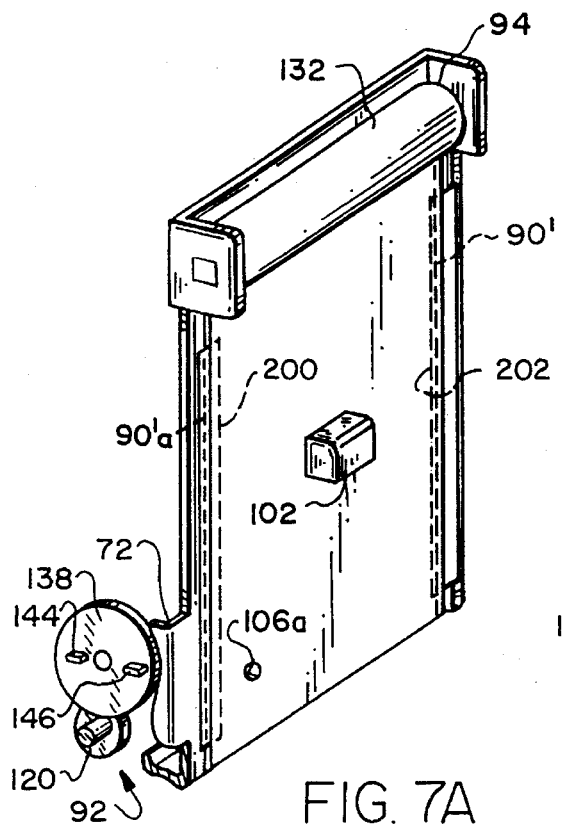
FIGS. 7 A–D illustrate various operative conditions of a pair of shutter curtains forming a blocking assembly of the shuttle.
Figure 7B:
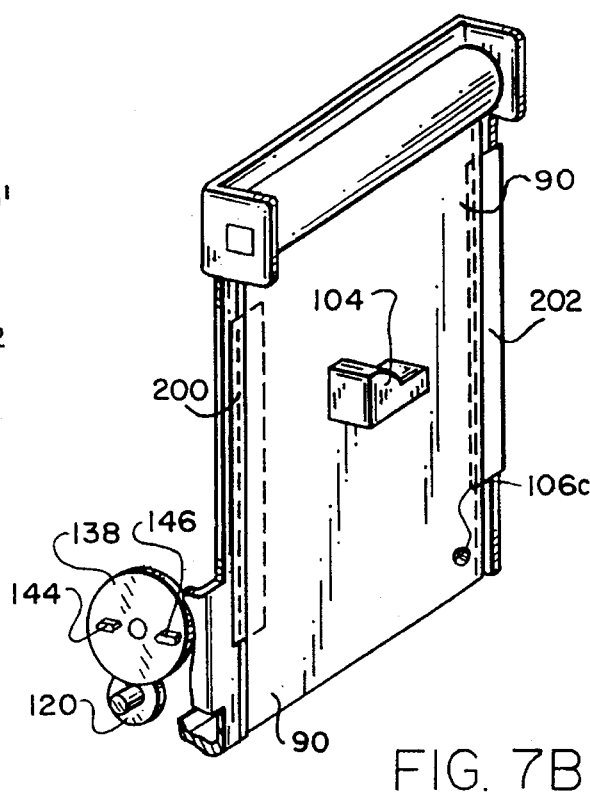
Figure 7C:
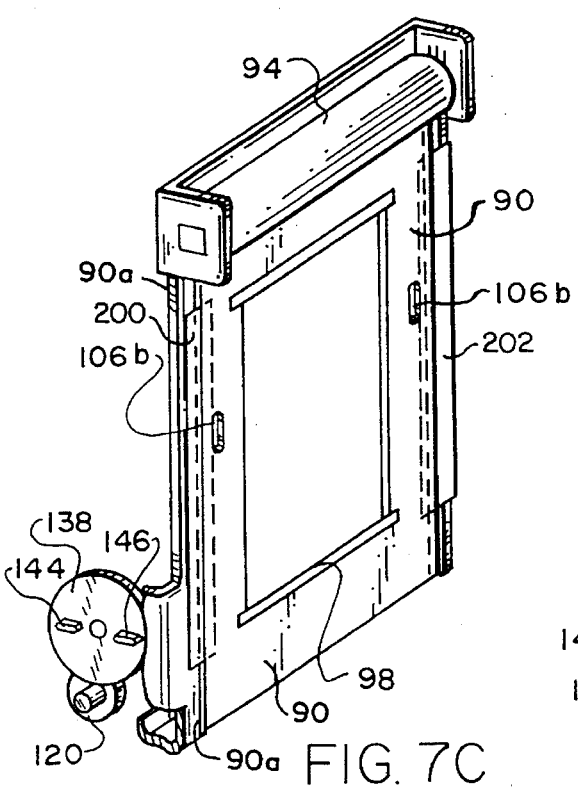
Figure 7D:
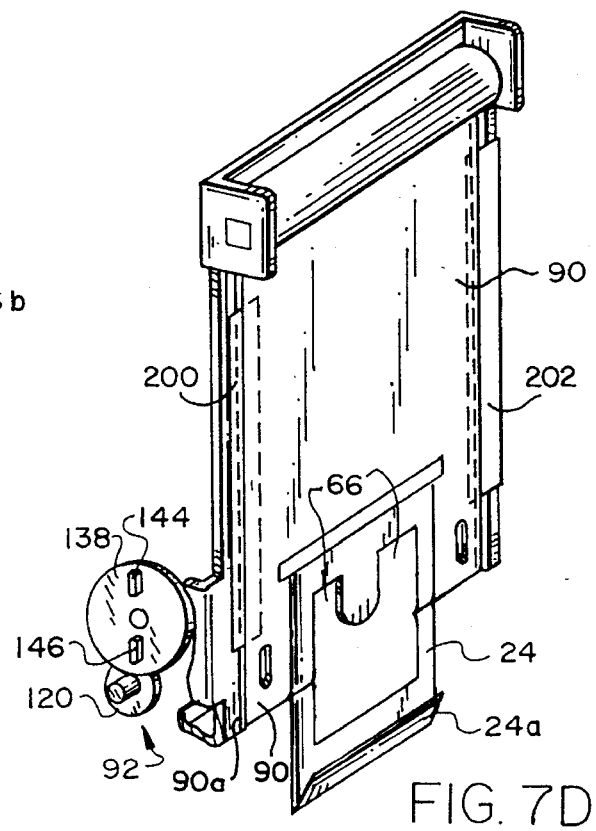
Figure 8:
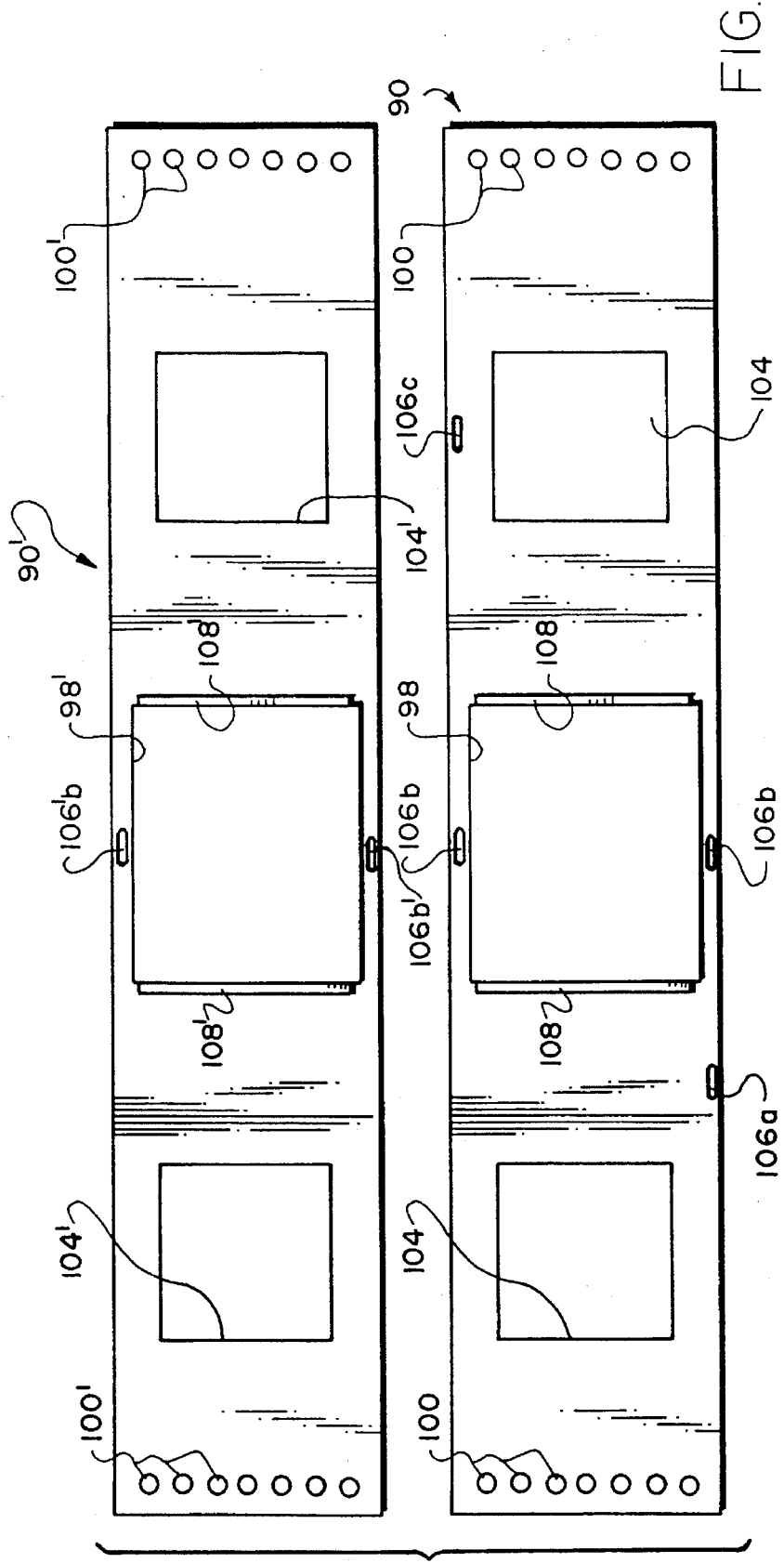
FIG. 8 is a plan view of a pair of shutter shutter members shown in FIGS. 7 A–D.
Figure 9:
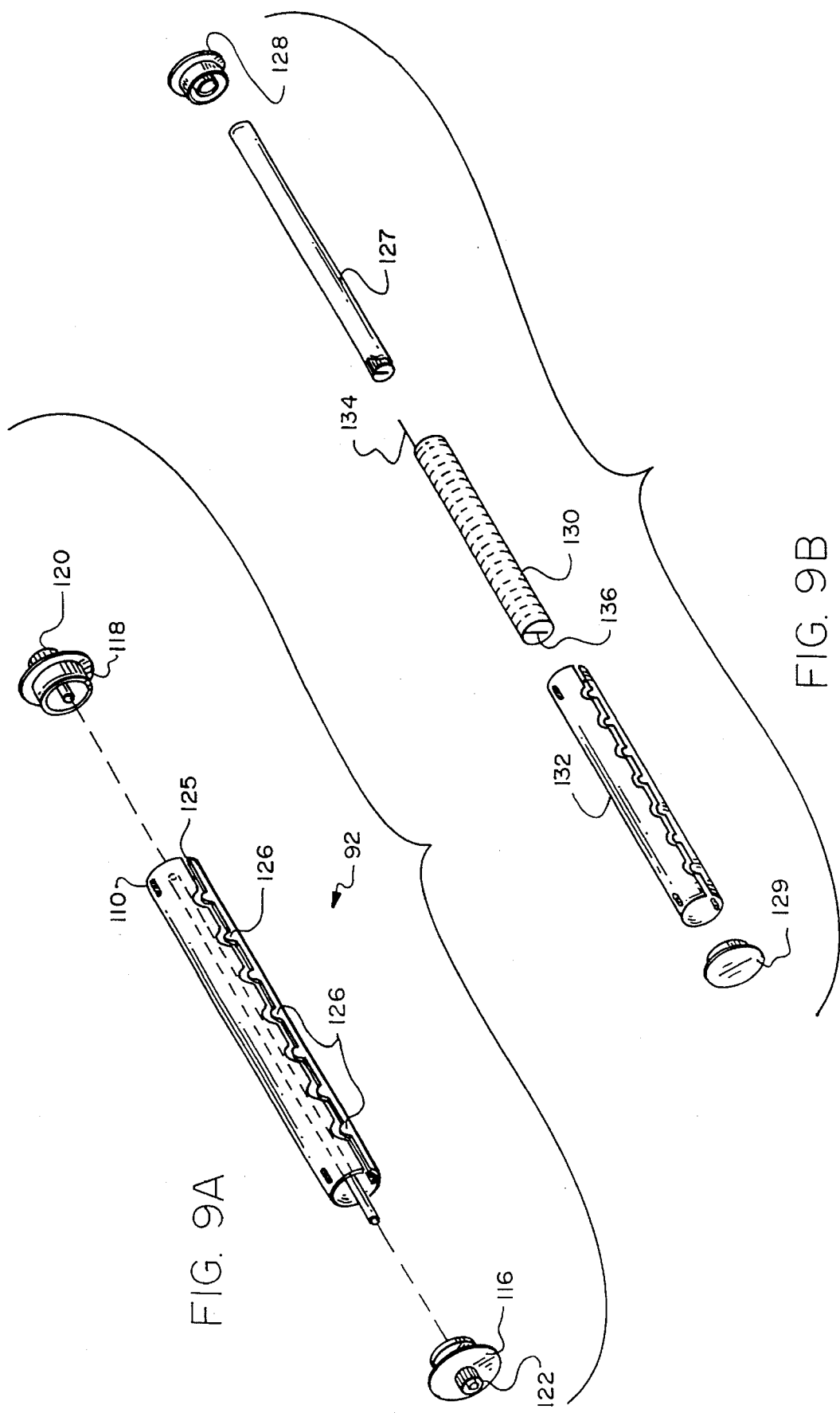
FIGS. 9A and 9B are an enlarged and fragmented perspective views of certain components forming part of the shuttle.

Reference is made now to FIGS. 7 A–D & 8 for illustrating the pair of shutter assemblies 90, 90'. In this embodiment, it is made of a thin, opaque, flexible, and lightweight material which possesses a low-coefficient of friction and is durable. Also, the shutter material should, preferably, be chemically non-reactive with the film units. In a preferred embodiment, the shutter assemblies 90, 90' are made a polymeric material, such as TEDLAR™, which is commercially available from E. I. Dupont de Nemours and Company, Wilmington, Delaware, USA. Other similar materials, can, of course, be utilized. As seen in FIG. 8, each of the shutter assemblies 90, 90' has a generally rectangular configuration and is provided with central exposure apertures 98, 98' and a plurality of aligned attachment openings 100, 100' at each longitudinal end which secures the shutters to the respective supply and takeup roll assemblies 92 and 94. The widths of each of the shutter assemblies 90, 90' is wider than the film unit being exposed, the exposure opening and the frame's exit slot so as to assist in maintaining a lighttight condition of the topmost unit in the cassette. The apertures 98, 98' are sized and shaped for allowing exposure of the film unit present at the cassette aperture 50 when the shutters are in their open or unblocking condition (FIG. 7C). The exposure apertures 98, 98' can also be moved to a partially open condition such as shown in FIG. 7D for allowing picking of a film unit 24 when the shuttle is in the processor 30 and it is desired to eject or pick the exposed film unit.

With continued reference to FIGS. 8 and 7A–D, it is noted that one of the shutter assembly 90 has indicia 102 and 104 on opposite sides of the aperture 98. In this regard, the indicia 102 can be observed through the aperture openings 46, 50, 64 when the shutter 90 is in a preexposure or camera ready condition, while the indicia 104 can be observed following exposure, indicating that the blocking assembly has been fully fired and the exposed film can be processed. Accordingly, an operator will be able to immediately determine the condition of the film unit in the shuttle assembly 20 so as to avoid improper handling. The marginal edges of both the shutters 90, 90' are provided with encoding apertures 106a, 106a'; 106b, 106b'; and 106c, 106c'. The encoding apertures selectively cooperate with sensing beams (not shown) and the photodetector openings to indicate to the processor the various operative conditions of the shutters 90 and their exposure aperture: For instance, the apertures 106a, 106a' are alignable with corresponding openings 86 in the frame and the covers for allowing a photodetector beam to travel therethrough for indicating to the processor that the shutter is in the fully recocked position (FIG. 4A). The apertures 106b, 106b' are simultaneously alignable with openings 86, 86a; 89, 89a for indicating that the apertures 98, 98' are in its partially opened picking mode, see FIG. 7D. The apertures 106c, 106c' are alignable with the openings 89, 89a for indicating that the shutter has fired, see FIG. 7B. The opening 88a is alignable with the opening in the frame 89 and a corresponding cassette opening (not shown) for indicating the fact that the negative cassette is out of film. As viewed in FIG. 8, a pair of stiffeners 108 are attached to each of the shutter shutters 90, 90' at opposite ends adjacent the respective apertures 98, 98' for preventing possible tearing of the shutters or hanging of the shutters as the latter moves relative to the main frame assembly 60.

It will be appreciated that the openings 98', 106' a,b,c of the second shutter 90' are slightly larger than their counterpart openings of the first shutter 90 so as to ensure the respective openings remain in coincidence so that one of the openings do not occlude the openings of the juxtaposed shutter 90' as might otherwise occur during travel between the noted blocking and unblocking conditions.

As best shown in FIGS. 7 A–D there is provided a pair of elongated light baffles 200, 202 which cooperate with the shutters 90, 90'. Each light baffle 200, 202 is, preferably, a strip of Tedlar™ which is opaque and has a relatively low coefficient of friction. These baffles have distal longitudinal edges which are interposed between the shutters 90, 90'. The opposite edges of the light baffles are adhesively bonded to the frame 60. The baffles extend beyond the extent of the frame aperture 64. Because the baffles are interposed between the shutters they tend to form additional passages for the light to travel and thereby minimize the ability of light to pass to the film unit. The low coefficient of friction is necessary so as to not inhibit the movement of the shutters.

Reference is now made to FIGS. 2, 7 A–D, 9 & 10 for illustrating one preferred embodiment of an escapement mechanism 96 for use in controlling the advancement of the blocking assembly. The escapement mechanism 96 essentially includes a meter gear 138, a spring-biased escapement plate 140, and an escapement biasing spring 142. The meter gear 138 is rotatably mounted on the retainer plate 72, and its teeth meshingly engage the pinion gear 120. Consequently, as the supply roll assembly rotates the meter gear 138 rotates. The meter gear 138 may include a pair of first and second stop protrusions 144, 146 (FIGS. 7 A–D) and control the rotational indexing movement of the gear in one direction of rotation into 180° rotational segments. In this regard, the stops 144, 146 cooperate alternatively with an internal stop shoulder 148 formed integrally on the escapement plate. The back cover is formed with an opening 150 (FIG. 2) which permits a recocking mechanism to engage the meter gear and rotate the same in the opposite direction. Such a reversal drives the blocking assembly back to the first blocking condition from the second blocking condition; whereby the shuttle is ready for another exposure.

Figure 10:
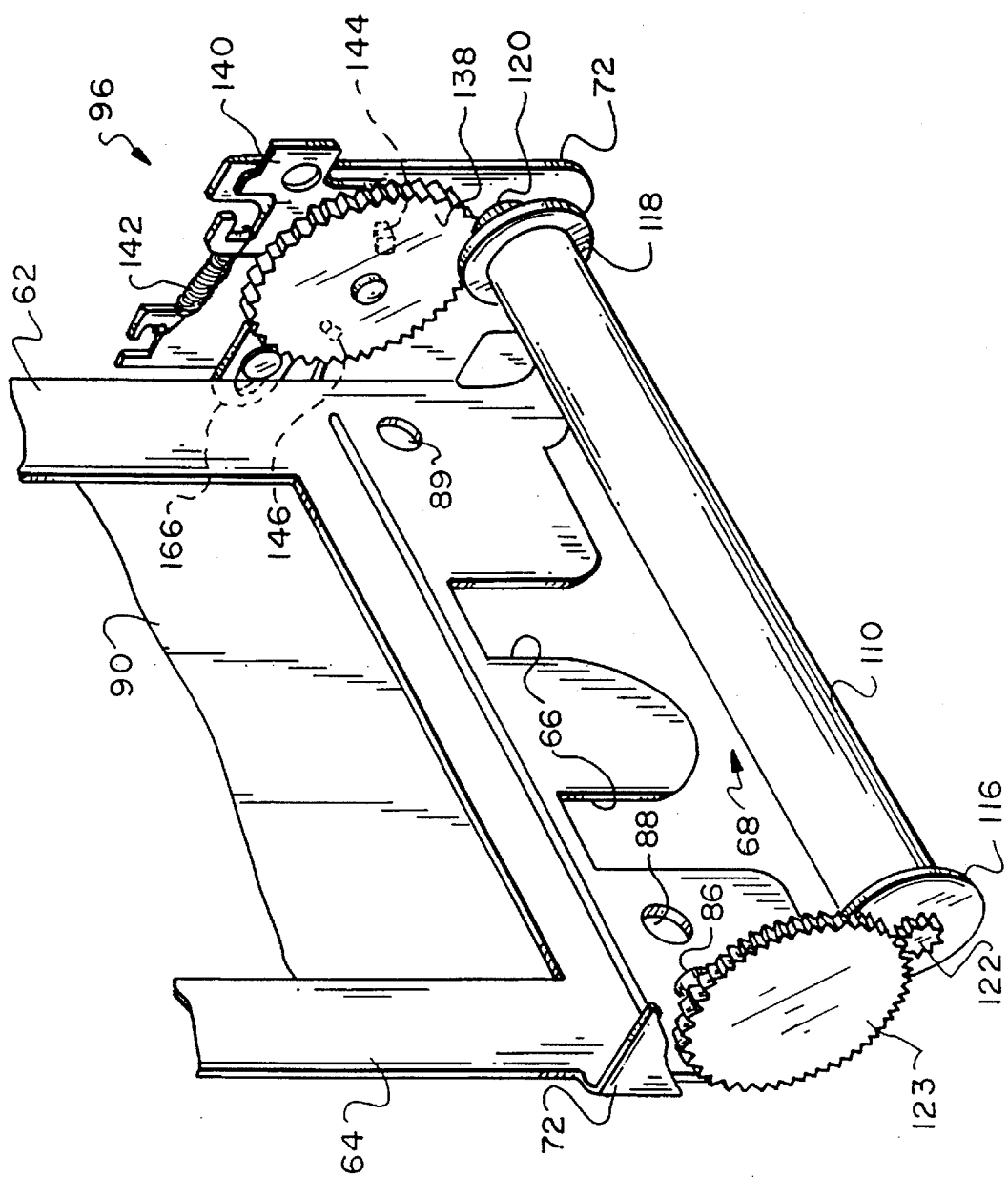
FIGS. 10 and 11 are an enlarged, fragmented, and partially exploded perspective views of an escapement mechanism of the blocking assembly; and, FIG. 12 is a fragmented perspective view of another embodiment of the present invention.
Figure 11:
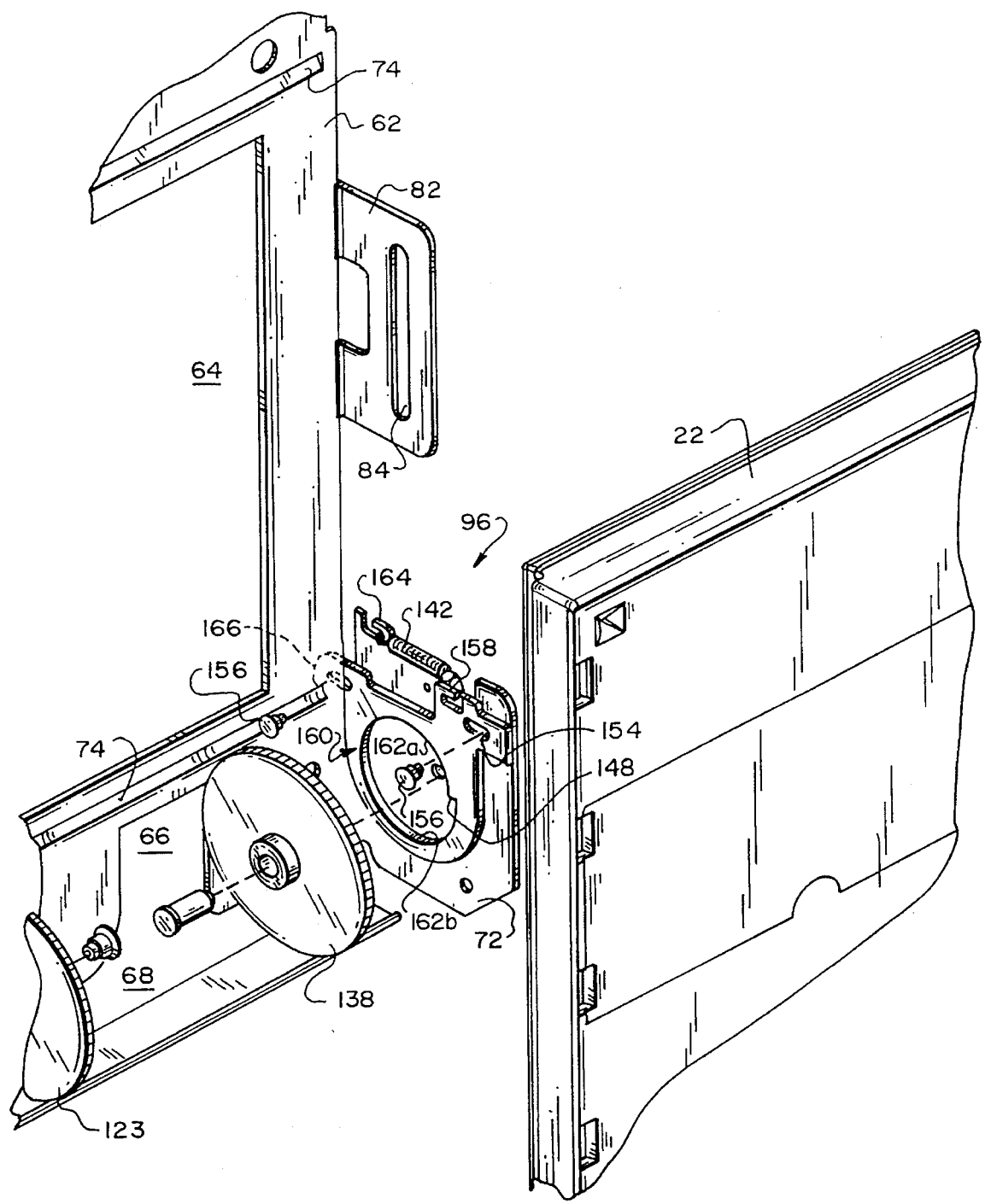

As viewed in FIGS. 10 and 11, the escapement plate 140 includes a pair of spaced elongated slots 154 for sliding reciprocation relative to corresponding retaining rivets 156 on the retainer plate which secure the escapement plate for sliding movement between locking and unlocking positions. Also, included is a hook portion 158, and a central opening 160 defined by two offset hemispherical portions 162a, 162b which define the radial stop shoulder 148. A radial projection 163 extends towards the center of the opening 160 and is sized and positioned so as to slow the speed of the meter gear 138, such that either one of the stops will more reliably engage the radial stop shoulder 148. One end of the escapement spring 142 is fastened to the hook 158 and the other end is fastened to a hook 164, whereby the plate 140 is biased toward the body portion 60 and its locking position. As a result, the stop shoulder 148 thereby prevents rotation of the supply roller assembly.

A rounded cam engaging protrusion 166 is formed on the escapement plate and is aligned with an opening 168 in the back cover so as to be activated by an adapter firing cam FC which is located in the camera adapter, such as described in the noted copending application entitled "CAMERA BACK ADAPTER AND METHOD".

When the cam protrusion 166 is displaced inwardly by the adapter's firing cam, such as when the shuttle is inserted into or removed from the adapter, the stop shoulder 148 is displaced rightwardly, as viewed in FIG. 10 to free the supply roller assembly for rotation by reason of the stored energy of the takeup roll assembly. Accordingly, the shutter unwinds from the supply roller assembly and the extent of the shutter payout is limited by the escapement mechanism 96. Rotation of the meter gear continues until its stop 146 travels about 180° and engages the stop shoulder 148. This stopping action occurs because the stop shoulder 148, under the influence of the spring 142, returns to its original stopping or locking position, such as after the cam 166 no longer engages the adapter's firing cam FC during continued insertion movement of the shuttle into the adapter. The shutters are thus indexed from their first blocking condition to their unblocking condition, whereby the apertures are displaced so that they are precisely in registration with the aligned exposure apertures.

Following exposure by the camera, an operator can remove the shuttle from the adapter. In the process of so doing, the cam protrusion 166 is reengaged by the adapter's firing cam FC during movement of the shuttle out of the adapter. This withdrawal has the effect of moving the stop shoulder 148 out of engagement with the stop 146. Thus, the meter gear 138 is free to rotate with the supply roller assembly under the influence of the stored energy of the takeup roller. Such rotation continues until the stop 144 rotates 180 degrees; whereupon it reengages the stop shoulder 148. In this regard, the stop shoulder 148 moves back to its locking position, whereby it is engaged by the stop, after the cam 166 clears the adapter's firing cam. As a result of the foregoing, the shutter 90 has been indexed from the noted unblocking condition (FIG. 7C) to its second blocking or fully fired condition (FIG. 7B). In this latter condition, the exposure apertures 98, 98' are out of alignment with the noted cassette and shuttle apertures for terminating or preventing exposure. Thus, the blocking assembly is controlled by the escapement mechanism 96, whereby the former is indexed automatically from its first blocking condition to its unblocking condition and next to its second blocking condition for completion of the exposure cycle.

Figure 12:
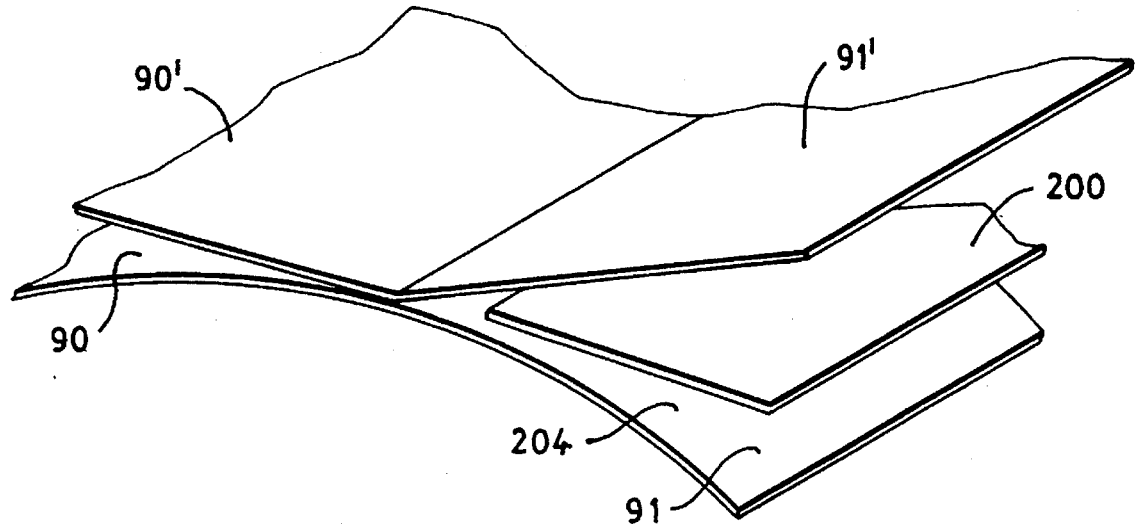

Reference is made to FIG. 12 for illustrating another embodiment of the present invention. The shutters 90, 90' are joined along their longitudinal edges as shown so as to create flaps 91, 91'. The flaps 91, 91' define grooves 204 which extend along a significant portion of the longitudinal extent of the shutters 90, 90a and are adapted to accommodate a strip 200. The strips are guided by the grooves and provide the additional passageways for light to travel so as to minimize the likelihood of light leaking to the film. While this embodiment shows the use of a pair of shutters which are joined at their edges, this invention envisions a single shutter having a pair of flaps extending along the longitudinal edges.

The present invention may be embodied in other specific forms without departing from the spirit or central characteristics thereof. The present embodiments, are therefore, to be considered in all respects as illustrative and not restrictive. The scope of the present invention being indicated by the appended claims rather than by the foregoing description and all changes which come within the meaning of the range of equivalency of the claims are therefore intended to be embraced therein.

What is claimed is:

1. In an apparatus for use in shuttling at least a film container having an exposing opening and carrying at least a photosensitive film unit, wherein the film shuttling apparatus comprises a portable lighttight shuttle housing assembly for removably receiving the film container; the housing assembly including an exposure aperture registerable with the film container exposing opening; a light blocking means coupled to said housing assembly and operable by a control means for automatically changing between light blocking and unblocking conditions relative to the exposing opening and said exposure aperture; and control means operably coupled to said light blocking means and being selectively operable in response to an image recording apparatus and a film processing apparatus for controlling said light blocking means between said light blocking and unblocking conditions; the improvement comprising:

said light blocking means comprising a shutter assembly including at least a pair of superimposed, flexible and opaque shutters, each of said shutters is provided with at least one shutter aperture aligned with said other shutter aperture, said shutters being connected at their respective opposite ends to a supply roller assembly and a takeup roller assembly mounted in said housing assembly, said shutters being wrappable on said supply roller assembly and said takeup roller assembly so as to move conjointly between said takeup and supply assemblies whereby said shutter apertures can move into and out of registry with the exposing opening and said exposure aperture; and, a pair of light baffles, each one being interposed between a respective longitudinal edge of said pair of shutters, each of said baffles extends along one of the longitudinal edge portions of said curtain for a distance which exceeds the length of said housing exposing aperture and thereby form labyrinth passages with and between said shutter assemblies which enhance lighttightness of said shuttle apparatus.

2. An apparatus for use in shuttling at least a photosensitive film unit housed in a film container having an exposing opening, between an image recording apparatus whereat the film unit can be exposed, and a film processing apparatus whereat the film unit can be removed for processing, said film shuttling apparatus comprising:

a portable lighttight shuttle housing assembly for removably receiving the film container; said housing assembly including an exposure aperture registerable with the film container exposing opening;

a light blocking means coupled to said housing assembly and operable to by a control means for automatically changing between light blocking and unblocking conditions relative to the exposing opening and said exposure aperture;

control means operably coupled to said light blocking means and being selectively operable in response to the image recording apparatus and the film processing apparatus for controlling said light blocking means between said light blocking and unblocking conditions;

said light blocking means comprises a shutter assembly including at least a pair of superimposed, flexible and opaque shutter assemblies, each of said shutter assemblies is provided with at least one shutter aperture aligned with said other shutter aperture, said shutter assemblies being connected at their respective opposite ends to a supply roller assembly and a takeup roller assembly mounted in said housing assembly, said shutter assemblies being wrappable on said supply roller assembly and said takeup roller assembly so as to move cojointly between said takeup and supply assemblies whereby said shutter apertures can move into and out of registry with the exposing opening and said exposure aperture; and, a pair of light baffles, each one being interposed between a respective longitudinal edge of said pair of shutter assemblies, each of said baffles extends along one of the longitudinal edge portions of said shutters for a distance which exceeds the length of said housing exposing aperture and thereby form labyrinth passages with and between said shutter assemblies which enhance lighttightness of said shuttle apparatus.

3. The apparatus defined in claim 2 wherein said pair of shutter assemblies is joined together adjacent their longitudinal edges for forming longitudinally extending grooves; each one of said pair of light baffles is slidably interposed within a respective one of said grooves so as to form labyrinth passages for light with said shutter assemblies which enhance the lightight performance of said apparatus.

4. The apparatus of claim 3 wherein said opaque shutter assembly is comprised of an elongated strip of flexible, lightweight, and low coefficient friction material that has each of its leading and trailing end portions attached to a respective one of said supply and takeup roller assemblies.

5. The apparatus as defined in claim 4 wherein each of said light baffles is made of a strip of opaque material that is attached along one longitudinal edge thereof to said housing assembly and has its opposite longitudinal edge free so as to extend between said shutters assemblies.

6. The apparatus as defined in claim 5 wherein said opaque strip is comprised of a flexible, lightweight, and low coefficient friction material.

7. The apparatus as defined in claim 6 wherein one of said shutter exposure apertures is larger than the other of said shutter exposure apertures.

8. A method for reducing light leaks in a shuttle mechanism for use in shuttling at least a photosensitive film unit housed in a film container having an exposing opening between an image recording apparatus whereat a film unit can be exposed, and a film processing apparatus whereat the film unit can be removed from the film container and the shuttle for processing, said method comprising the steps of:

providing a portable shuttle housing assembly including an exposure aperture registerable with the container exposing opening when the container is received within the housing assembly for allowing exposure of a film unit presented at the exposing opening;

providing the housing assembly with a movable light blocking means which is movable between at least first and second light blocking conditions and a light unblocking condition;

providing a control mechanism for controlling movement between the light blocking and unblocking conditions;

providing light blocking means which comprises a shutter assembly including at least a pair of superimposed, flexible and opaque shutter curtains, each of the shutter curtains is provided with at least one shutter aperture aligned with the other shutter aperture, the shutter curtains being connected at their respective opposite ends to a supply roller assembly and a takeup roller assembly mounted in the housing assembly, the shutter curtains being wrappable on the supply roller assembly and the takeup roller assembly so as to move conjointly between the takeup and supply assemblies, whereby the shutter apertures can move into and out of registry with the exposing opening and the exposure aperture; and, interposing a light baffle between a respective longitudinal edge of the pair of shutter curtains so that each of the baffles extends along one of the longitudinal edge portions of the shutter curtains for a distance which exceeds the length of the housing exposing aperture to thereby form labyrinth passages with and between the shutter curtains which enhance lighttightness of the shuttle apparatus.

* * * * *